United States Patent
Yoshinori et al.

[11] Patent Number: 5,921,100
[45] Date of Patent: Jul. 13, 1999

[54] AIR CONDITIONING APPARATUS FOR SEAT OF VEHICLE

[75] Inventors: Takeshi Yoshinori, Okazaki; Shinji Aoki, Kariya; Yuichi Kajino, Nagoya; Hajime Ito, Kariya; Hikaru Sugi, Nagoya, all of Japan

[73] Assignee: Denso Corporation, Kariya, Japan

[21] Appl. No.: 09/087,813

[22] Filed: May 29, 1998

[30] Foreign Application Priority Data

Jun. 3, 1997 [JP] Japan .................................. 9-144399
Mar. 5, 1998 [JP] Japan ................................ 10-053344

[51] Int. Cl.$^6$ .............................. B60H 1/32; B60H 1/02; B60H 3/00
[52] U.S. Cl. .................. 62/244; 237/12.3 A; 165/43; 219/202
[58] Field of Search .................. 62/244; 237/12.3 A; 219/202; 165/43

[56] References Cited

U.S. PATENT DOCUMENTS

| 4,572,430 | 2/1986 | Takagi ..................................... 237/2 A |
| 4,718,244 | 1/1988 | Kobayashi ............................. 62/176.5 |
| 5,284,025 | 2/1994 | Kajitani ................................... 62/160 |
| 5,450,894 | 9/1995 | Inoue ........................................ 165/43 |

FOREIGN PATENT DOCUMENTS 59-164552 U 11/1984 Japan .
A-62-71715 4/1987 Japan .

*Primary Examiner*—Henry Bennett
*Assistant Examiner*—Melvin Jones
*Attorney, Agent, or Firm*—Harness, Dickey & Pierce, PLC

[57] ABSTRACT

An air conditioning apparatus for a seat of a vehicle includes a seat air-blowing unit disposed in a lower portion of the seat, and a seat duct for blowing air from an air conditioning unit to the seat air-blowing unit. The air conditioning unit includes a case for forming therein a cool air passage and a warm air passage, and a switching door for opening and closing the cool air passage and the warm air passage. When a stationary state is set from a cool-down state during cooling mode, the switching door closes the cool air passage to fully open the warm air passage. Thus, inside air is introduced into the warm air passage from a foot air outlet of the air conditioning unit, is supplied to the seat air-blowing unit through the seat duct, and is blown from a seat surface of the seat toward a passenger seated on the seat. As a result, in the air conditioning apparatus, cool air and inside air can be readily switched with a simple structure.

16 Claims, 5 Drawing Sheets

AIR CONDITIONING APPARATUS FOR SEAT OF VEHICLE

CROSS-REFERENCE TO RELATED APPLICATION

This application is related to and claims priorities from Japanese Patent Applications No. Hei. 9-144399 filed on Jun. 3, 1997, and No. Hei. 10-53344 filed on Mar. 5, 1998, the contents of which are hereby incorporated by reference.

BACKGROUND OF THE INVENTION

1. Field of the Invention

The present invention relates to an air conditioning apparatus for a seat in a passenger compartment of a vehicle, which supplies air toward an air passage in the seat to be blown air toward a passenger seated on the seat from a surface sheet of the seat.

2. Description of Related Art

Conventionally, an air conditioning apparatus for a seat of a vehicle is described in JP-U-59-164552. In the air conditioning apparatus, air conditioned in a front air conditioning unit is supplied to an air chamber in the seat through a seat duct, and air in the air chamber is blown from a surface sheet of the seat to improve pleasant feeling for a passenger seated on the seat in the passenger compartment. In the conventional apparatus, during a cool-down state in the summer, cool air is blown from the seat to give cool feeling to the passenger seated on the seat. However, during a stationary state where the temperature in the passenger compartment is lowered from the cool-down state at a stable temperature, cool air is still blown from the seat; and therefore, over-cool feeling is given to the passenger. In the conventional apparatus, when air blown toward the seat is switched from cool air to inside air (i.e., air inside the passenger compartment) during the stationary state, a supplementary air-mixing function is necessary except of a main air mixing function, to supply inside air to the air chamber of the seat while cool air is supplied to the passenger compartment. As a result, the structure of the apparatus becomes complex, and production cost thereof is increased.

SUMMARY OF THE INVENTION

In view of the foregoing problems, it is an object of the present invention to provide an air conditioning apparatus for a seat of a vehicle, which can switch air introduced into the seat from cool air to inside air or from warm air to inside air while having a simple structure.

According to the present invention, an air conditioning apparatus for a seat of a vehicle includes a mode switching unit for switching a first mode where air from an air conditioning unit is introduced into the seat through a seat duct, and a second mode where air inside the passenger compartment is introduced into the seat through the seat duct. Therefore, when the first mode is selected by the mode switching unit, air conditioned in the air conditioning unit is supplied to the seat, and the conditioned air is blown from a surface sheet of the seat toward a passenger seated on the seat. Thus, pleasant air-conditioning feeling is given to the passenger at an air-conditioning starting time. On the other hand, when the second mode is selected by the mode switching unit, air inside the passenger compartment is supplied to the seat through the seat duct, and the inside air is blown from the surface seat of the seat toward the passenger seated on the seat. In this case, because inside air inside the passenger compartment is supplied to the seat through the seat duct, it is not necessary to make inside air in the air conditioning unit, and air supplied to the seat can be readily switched between air from the air conditioning unit and inside air.

Preferably, a blower disposed in the seat duct is rotated in the same rotational direction when the mode switching unit switches the air-blowing mode between the first mode and the second mode. Therefore, the first mode and second mode are readily changed, while the blower is rotated in the same direction.

More preferably, the air conditioning unit has a first air outlet for blowing air toward a lower portion at a front side in the passenger compartment, and air inside the passenger compartment is introduced into the seat through the seat duct from the first air outlet, during the second mode. Alternatively, the seat duct has a second air outlet for blowing air toward a lower portion at a rear side in the passenger compartment, and air inside the passenger compartment is introduced into the seat through the seat duct from the second air outlet, during the second mode. Thus, in the air conditioning apparatus, it is not necessary to provide an introduction port for introducing inside air.

Still more preferably, the seat duct is a duct for supplying warm air conditioned in the air conditioning unit to a lower portion at a rear side in the passenger compartment. Alternatively, the seat duct is a duct for supplying cool air conditioned in the air conditioning unit to an upper portion at a rear side in the passenger compartment. Thus, a special seal duct is not necessary, and the air conditioning apparatus is produced in low cost.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Figure 1:
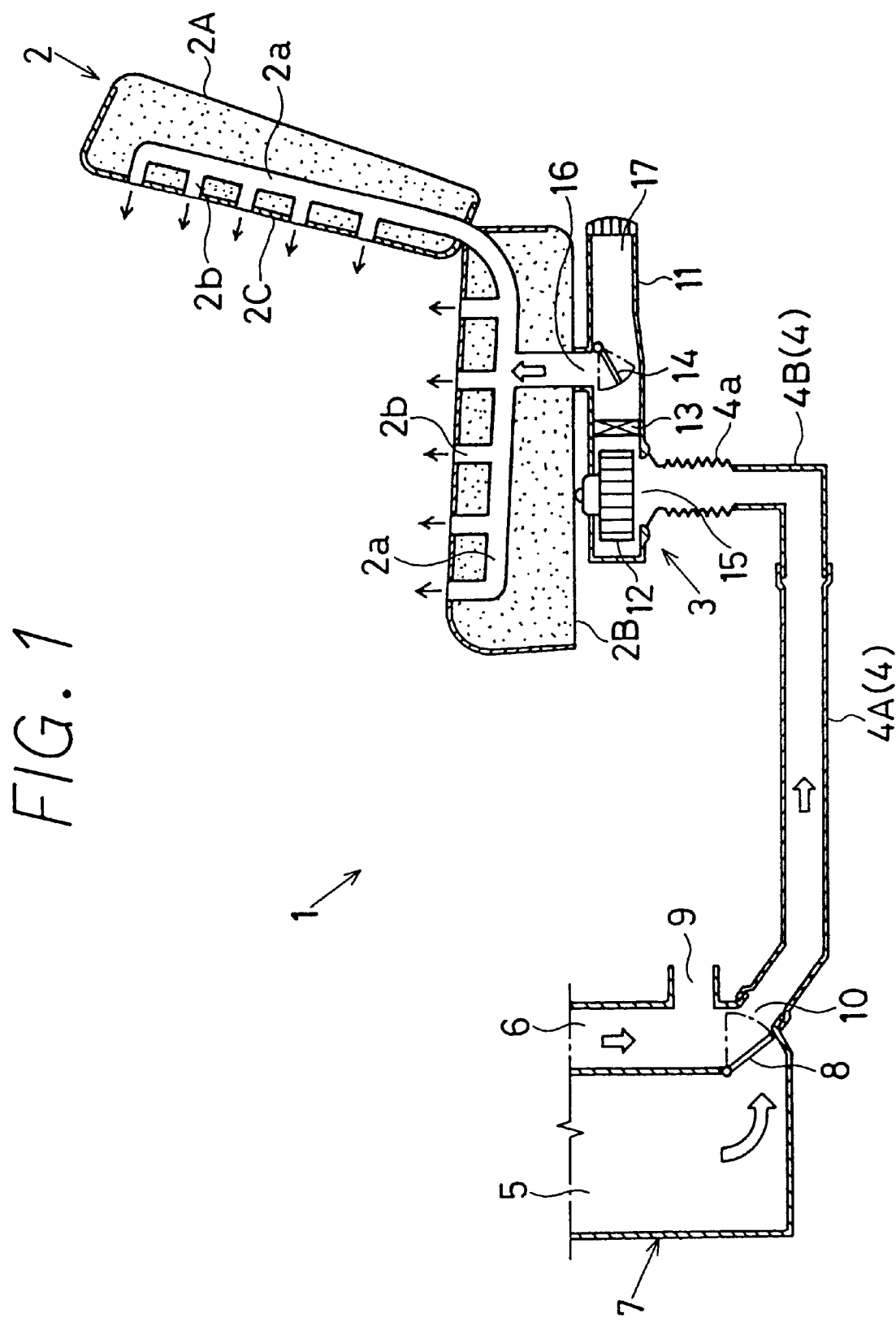
FIG. 1 is a schematic sectional view showing an air conditioning apparatus for a seat of a vehicle according to a first preferred embodiment of the present invention.

Preferred embodiments of the present invention are described hereinafter with reference to the accompanying drawings.

A first preferred embodiment of the present invention will be now described with reference to FIG. 1.

An air conditioning apparatus 1 for a seat of a vehicle includes a seat air-blowing unit 3 disposed under a front seat 2, and a seat duct 4 for supplying air from an air conditioning unit to the seat air-blowing unit 3. The air conditioning unit includes a case 7 for forming therein a cool air passage 5 and a warm air passage 6, and a switching door 8 for opening and closing the cool air passage 5 and the warm air passage 6. The case 7 includes a foot air outlet 9 for blowing warm air toward the foot area of a passenger seated on a front seat through the warm air passage 6, and a connection port 10 to which the seat duct 4 is connected. Through the connection port 10, the seat duct 4 can be communicated with the cool air passage 5 or the warm air passage 6 selected by the switching door 8. The switching door 8 is disposed in the case 7 rotatably between a solid line position and a chain line position in FIG. 1. When the switching door 8 is rotated to the solid line position in FIG. 1, the cool air passage 5 is closed and the warm air passage 6 is fully opened. On the other hand, when switching door 8 is rotated to the chain line position in FIG. 1, the cool air passage 5 is fully opened and the warm air passage 6 is fully closed. The switching door 8 is driven by an actuator such as a servomotor.

The seat duct 4 includes a floor duct 4A and a flexible duct 4B. The floor duct 4A is disposed on a floor to extend approximately linearly from the air conditioning unit along the floor. The flexible duct 4B is bent approximately perpendicularly relative to the floor duct 4A to extend upward. Bellows 4a are provided in the flexible duct 4B, so that the flexible duct 4B is moved to correspond to a movement of the seat 2. As the seat duct 4, a rear foot duct for supplying warm air toward the foot area of a passenger seated on a rear seat of the vehicle and a rear vent duct for supplying cool air toward the passenger seated on the rear seat can be used.

The seat air-blowing unit 3 includes a case 11 for forming an air passage, a blower 12 for compulsorily blowing air toward the case 11, an electric heater 13 (e.g., PTC heater) disposed at a downstream air side of the blower 12, a switching door 14 for switching air passages in the case 11. In the first embodiment, the seat air-blowing unit 3 is formed integrally with the front seat 2. Therefore, when the front seat 2 slides in a front-rear direction of the vehicle or moves in an up-down direction of the vehicle, the seat air-blowing unit 3 is also moved integrally with the front seat 2.

The case 11 has an air suction port 15 of the blower 12, an air-blowing port 16 through which air is blown toward a seat air passage in the seat 2, and a rear foot air outlet (warm air outlet) 17 through which air is blown toward the passenger seated on the rear seat. The air suction port 15 of the case 11 is formed at a downstream air end of the flexible duct 4B of the seat duct 4. The blower 12 is a centrifugal type, for example. Therefore, air sucked from the air suction port 15 can be blown approximately vertically in the case 11.

The switching door 14 opens and closes an air passage at a side of the seat 2 and an air passage at a side of the rear foot air outlet 17. That is, when the switching door 14 closes the air-blowing port 16 at the side of the seat 2, air is blown toward the foot area of the passenger seated on the rear seat in the passenger compartment from the rear foot air outlet 17. When the switching door 14 closes the air passage at the side of the rear foot air outlet 17, air is blown toward the seat air passage of the seat 2 from the air-blowing port 16. The switching door 14 is driven by an actuator such as a servomotor.

The electric heater 13 is operated, when the temperature of engine-cooling water is low and air is not heated sufficiently in the air conditioning unit. The electric heater 13 may be disposed at an upstream air side of the blower 12.

Electric parts such as the actuator for driving the switching door 8, the actuator for driving the switching door 14, the blower 12 and the electric heater 12 are electrically controlled by an air-conditioning control unit based on the inside air temperature, the temperature of air blown toward the passenger compartment, a target air temperature, and control signals such as an air outlet mode signal.

When a cooling mode is selected in the air conditioning unit and the switching door 8 is rotated to the chain line position in FIG. 1 to open the cool air passage 5 and to close the warm air passage 6, a first air-blowing mode is obtained in the seat air-blowing unit 3. When a cooling mode is selected in the air conditioning unit and the switching door 8 is rotated to the solid line position in FIG. 1 to close the cool air passage 5 and to open the warm air passage 6, a second air-blowing mode is obtained in the seat air-blowing unit 3.

During the first air-blowing mode in the seat air-blowing unit 3, cool air cooled in the air conditioning unit is supplied to the seat duct 4 through the cool air passage 5. On the other hand, during the second air-blowing mode in the seat air-blowing unit 3, inside air (i.e., air inside the passenger compartment) is introduced from the foot air outlet 9 of the air conditioning unit to the warm air passage 6, and is supplied to the front seat 2 by the seat air-blowing unit 3 through the seat duct 4. In the first embodiment, the blower 12 is rotated in the same direction when the air-blowing mode is changed from the first air-blowing mode to the second air-blowing mode.

The front seat 2 includes a seat back 2A and a seat cushion 2B each of which is covered by a seat surface sheet 2C having air permeability. An air distribution duct 2a and a plurality of seat air outlets 2b are formed within the seat back 2A and the seat cushion 2B. The air distribution duct 2a is connected to the air suction port 16 of the case 11, and the seat air outlets 2b are branched from the air distribution duct 2a to extend to the surfaces of the seat back 2A and the seat cushion 2B. Therefore, air supplied by the seat air-blowing unit 3 is distributed into each seat air outlet 2b through the air distribution duct 2a, and is blown toward the passenger seated on the front seat 2 from each seat air outlet 2b through the seat surface sheet 2C.

Next, an operation of the first embodiment will be now described.

(1) HEATING MODE

During the heating mode, the switching door 8 of the air conditioning unit closes the cool air passage 5, and the switching door 14 of the seat air-conditioning unit closes the rear foot air outlet 17. Therefore, warm air heated in the air conditioning unit is supplied to the seat duct 4 through the warm air passage 6, flows through the seat duct 4, and is supplied into the front seat 2 by the seat air-blowing unit 3. The warm air supplied into the front seat 2 passes through the air distribution duct 2a and the each seat air outlet 2b, and is blown from the seat surface sheet 2C toward the passenger seated on the front seat 2 in the passenger compartment.

When it is necessary to preferentially heat the foot area of a passenger seated on the rear seat in the passenger compartment, the switching door 14 closes the air suction port 16. Further, when it is necessary that air is blown from both of the seat surface sheet 2C of the front seat 2 and the rear foot air outlet 17, the switching door 14 is rotated to an intermediate position (e.g., the solid line position in FIG. 1) to open both the air suction port 16 and the rear foot air outlet 17.

(2) COOLING MODE

When a cool-down state is set during the cooling mode, the switching door 8 of the air conditioning unit closes the warm air passage 6 to open the cool air passage 5, and the switching door 14 of the seat air-conditioning unit closes the rear foot air outlet 17 to fully open the air suction port 16. Therefore, cool air is supplied to the seat duct 4 through the cool air passage 5, flows through the seat duct 4, and is supplied to the seat air-blowing unit 3. At this time, because the rear foot air outlet 17 is interrupted by the switching door 14, cool air does not flows through the rear foot air outlet 17. Cool air supplied into the front seat 2 by the seat air-blowing unit 3 is distributed in the air distribution duct 2a, and is blown toward the passenger seated on the front seat 2 from the seat surface sheet 2C through the each seat air outlet 2b.

When the temperature in the passenger compartment is lowered at a predetermined temperature and a stationary state is set from the cool-down state during the cooling mode, over-cooling feeling is given to the passenger seated on the front seat 2 when cool air is still blown from the seat surface sheet 2C of the front seat 2. According to the first embodiment, in this case, the switching door 8 of the air conditioning unit closes the cool air passage 5 as shown in FIG. 1. In this case, even when the switching door 8 opens the warm air passage 6, warm air does not flows through the warm air passage 6 because the cooling mode is set in the air conditioning unit. Thus, by operating the blower 12, inside air is supplied to the warm air passage 6 in the case 7 through the foot air outlet 9. Inside air supplied to the warm air passage 6 flows through the seat duct 4, is supplied into the front seat 2, and is blown from the seat surface sheet 2C. Because the temperature of inside air of the passenger compartment is higher than the temperature of cool air conditioned by the air conditioning unit, it can prevent the over-cool feeling due to air blown from the seat surface sheet 2C of the front seat 2.

Further, by adjusting an opening degree of the cool air passage 5, cool air from the cool air passage 5 and inside air from the warm air passage 6 are mixed, and the mixed air having a suitable temperature is supplied to the air passage of the front seat 2.

Here, the effect of the air conditioning apparatus 1 according to the first embodiment will be now described.

When the temperature of the passenger compartment is lowered during the cool-down state and the stationary state is set from the cool-down state, air introduced into the front seat 2 is switched from cool air to inside air to prevent the over-cool feeling for the passenger seated on the front seat 2. Because inside air sucked from the foot air outlet 9 flows through the seat duct 4 when inside air is supplied into the front seat 2, a supplementary unit for obtaining inside air having the same temperature as the passenger compartment is not necessary, and cool air and inside air inside the passenger compartment can be readily switched using a simple structure. That is, only providing the switching door 8, cool air from the cool air passage 5 and inside air sucked from the foot air outlet 9 in the warm air passage 6 can be readily switched to adjust the temperature of air supplied to the air passage in the front seat 2.

Further, as the seat duct 4, the rear foot duct or the rear vent duct can be used. Therefore, it is not necessary to form a new seat duct 4 (particularly, the portion corresponding to the floor duct 4A), and the air conditioning apparatus 1 for the seat of the vehicle can be produced in low cost.

According to the first embodiment, because the blower 12 is disposed in the case 11 of the seat air-blowing unit 3, air can be compulsorily blown toward the front seat 2 in the seat air-blowing unit 3. Thus, even when the amount of air supplied from the air conditioning unit to the seat duct 4 is lowered, the amount of air blown toward the front seat 2 can be maintained by operating the blower 12.

Further, because the electric heater 13 is disposed at a downstream air side of the blower 12, heating capacity can be improved by using the electric heater 13 even when warm air is not heated sufficiently in the air conditioning unit during the heating mode.

Figure 2:
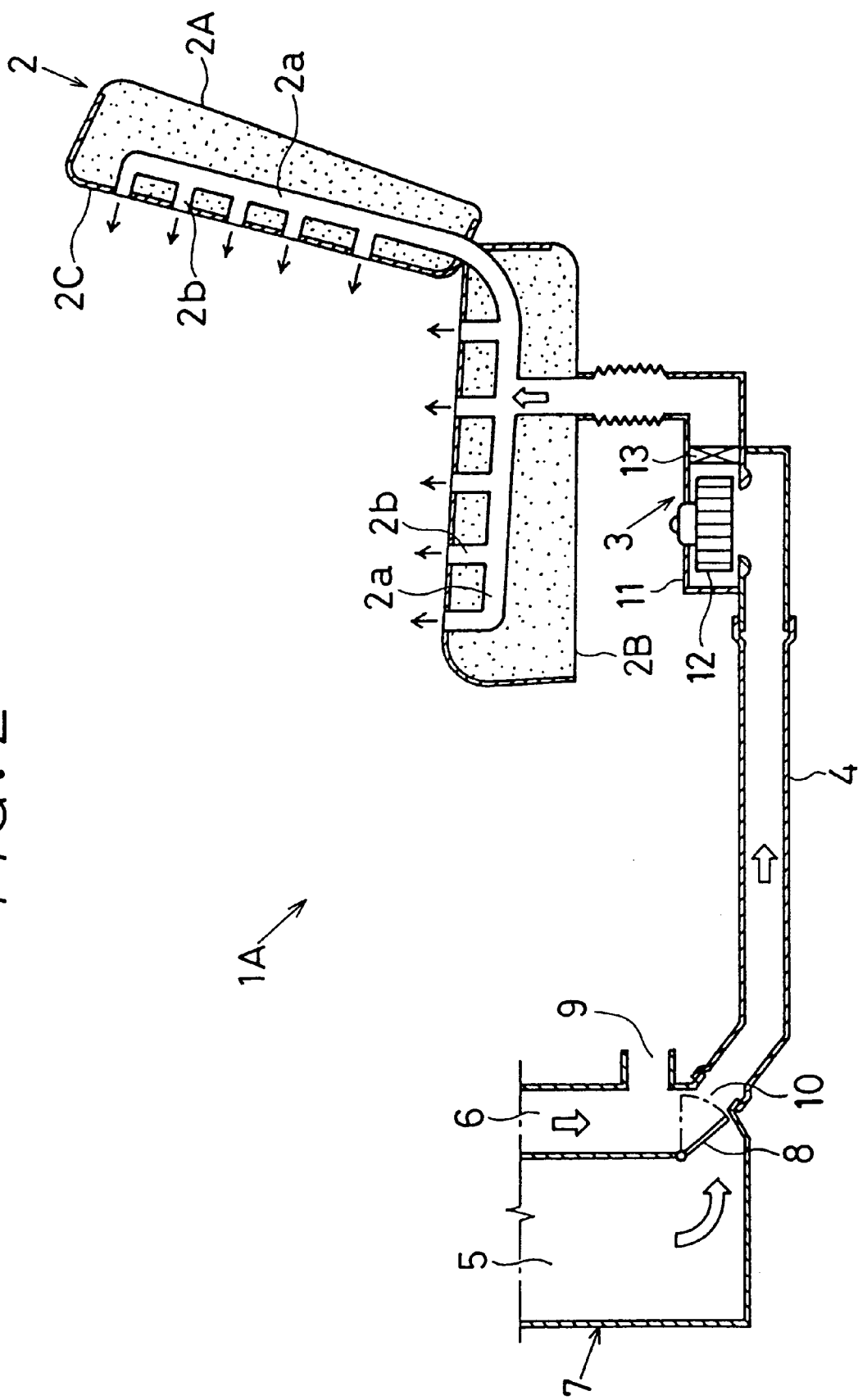
FIG. 2 is a schematic sectional view showing an air conditioning apparatus for a seat of a vehicle according to a second preferred embodiment of the present invention.

A second preferred embodiment of the present invention will be now described with reference to FIG. 2.

The second embodiment is a modification of the first embodiment. In the above-described first embodiment, the seat air-blowing unit 3 is assembled to a lower portion of the front seat 2. However, in the second embodiment, as shown in FIG. 2, the seat air-blowing unit 3 is separated from the front seat 2, and is disposed on the floor. In FIG. 2, the rear foot air outlet 17 is not indicated; however, the rear foot air outlet 17 can be provided similarly to the first embodiment. In the second embodiment, the other portions of an air conditioning apparatus 1A are similar to those in the first embodiment, and the explanation thereof is omitted.

A third preferred embodiment of the present invention will be now described with reference to FIGS. 3–5.

Figure 3:
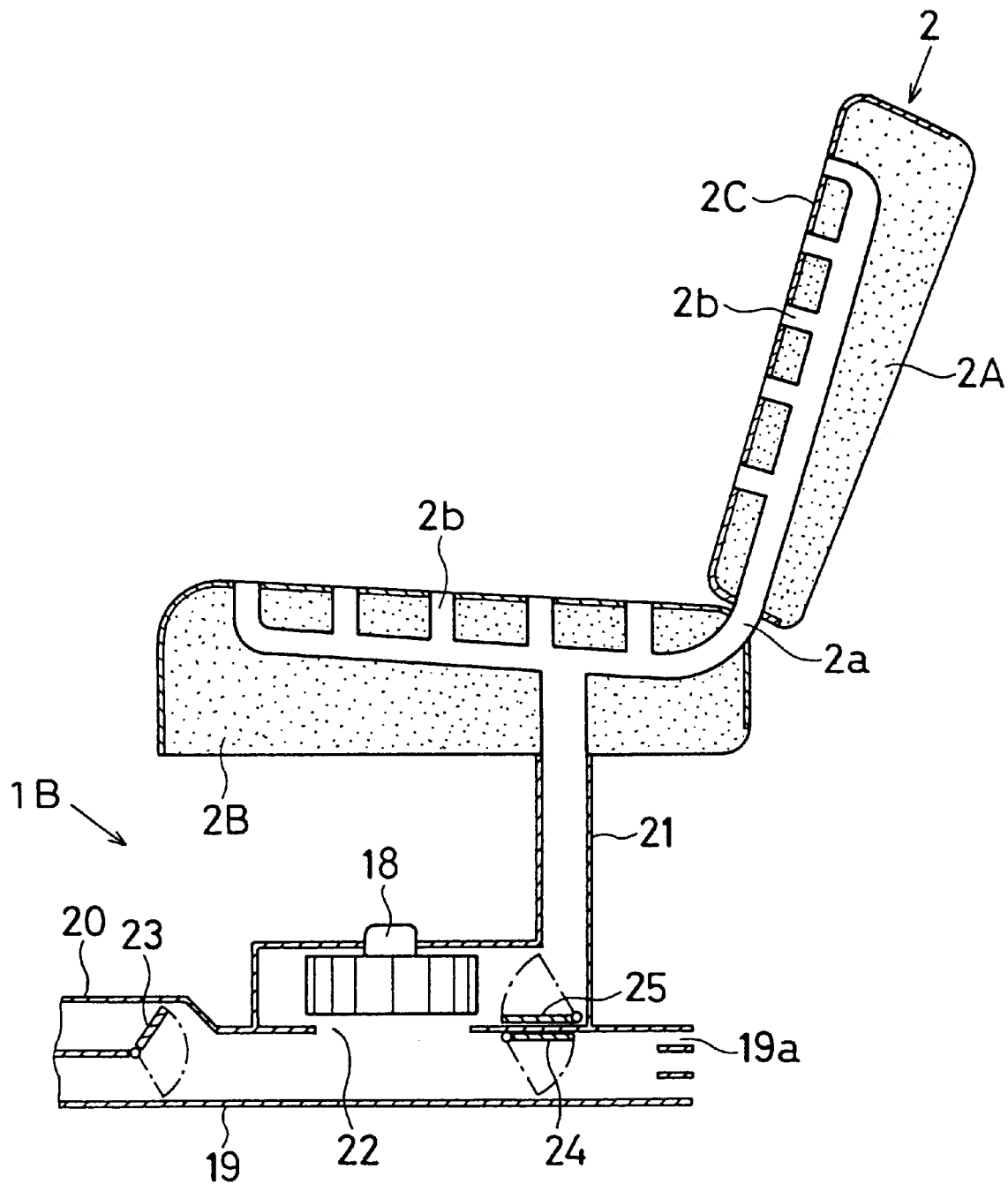
FIG. 3 is a schematic sectional view showing an air conditioning apparatus for a seat of a vehicle according to a third preferred embodiment of the present invention.

As shown in FIG. 3, an air conditioning apparatus 1B for a seat of a vehicle includes a case for leading air to the front seat 2, a blower 18 for generating air flow toward the front seat 2, and a switching unit for switching air passages in the case. The case includes a rear foot duct 19 for supplying warm air to the front seat 2 from an air conditioning unit, a cool air duct 20 for introducing cool air from the air conditioning unit to the rear foot duct 19, and a seat duct 21 extending from the rear foot duct 19 to the front seat 2. The blower 18 is disposed in the case between the rear foot duct 19 and the seat duct 21. In the third embodiment, the cool air duct 20 is branched from a rear vent duct for supplying cool air toward a passenger seated on a rear seat in the passenger compartment, and is joined into the rear foot duct 19.

The blower 18 is disposed at an upper side of the rear foot duct 19 on a downstream air side of a join point between the cool air duct 20 and the rear foot duct 19. The blower 18 sucks air in the rear foot duct 19 from an air suction port 22 provided in an upper wall of the rear foot duct 19, and blows the sucked air toward the seat duct 21.

The switching unit includes a switching door 23 disposed at the join point between the rear foot duct 19 and the cool air duct 20, a switching door 24 disposed in the rear foot duct 19 at a downstream air side of the air suction port 22, and a switching door 25 disposed at an upstream end of the seat duct 21. The switching door 23 is rotated between a solid line position and a chain line position in FIG. 3. When the switching unit 23 is rotated to the solid line position, the cool air duct 20 is closed. On the other hand, when the switching unit 23 is rotated to the chain line position, the cool air duct 20 is fully opened. The switching door 24 is rotated between a solid line position and a chain line position in FIG. 3. When the switching door 24 is rotated to the solid line position in FIG. 3, a rear air outlet 19a of the rear foot duct 19 is fully opened. On the other hand, when the switching unit 24 is rotated to the chain line position in FIG. 3, the rear air outlet 19a of the rear foot duct 19 is fully closed. The switching door 25 is rotated between a solid line position and a chain line position in FIG. 3 to open and close the seat duct 21. The switching doors 23–25 are driven by an actuator such as a servomotor, and the actuator is electrically controlled by an air-conditioning control unit.

Next, the operation of the air conditioning apparatus 1B according to the third embodiment will be now described.

Figure 4:
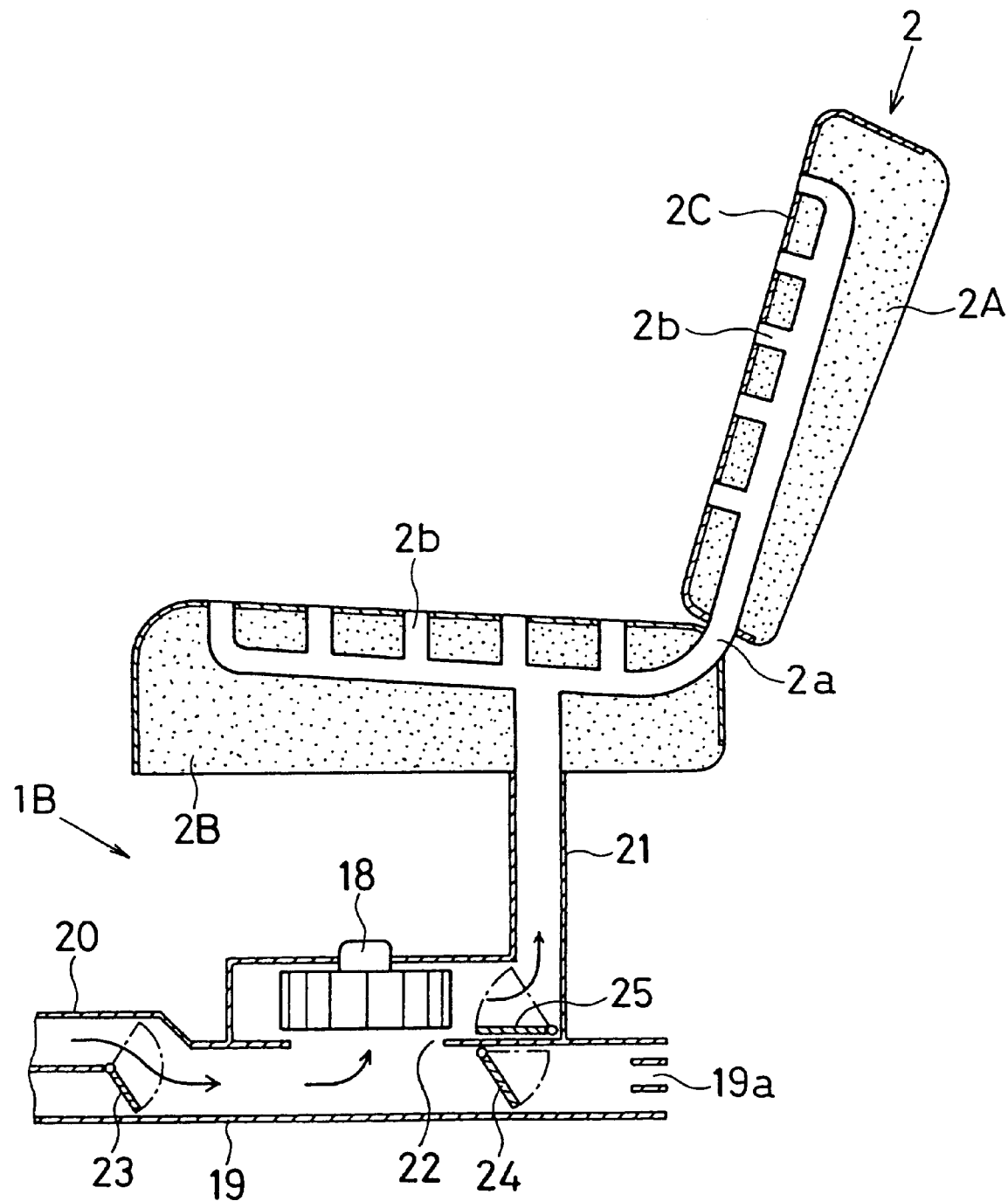
FIG. 4 is schematic sectional view showing a flow of cool air in the air conditioning apparatus according to the third embodiment.

A cool-down state is set during a cooling mode in the summer, the switching door 23 fully opens the cool air duct 20, the switching door 24 fully closes the rear air outlet 19a of the rear foot duct 19, and the switching door 25 fully opens the seat duct 21 as shown in FIG. 4. Therefore, cool air from the air conditioning unit is supplied from the rear vent duct to the rear foot duct 19 through the cool air duct 20, and is blown toward the seat duct by the blower 18 as shown by arrows in FIG. 4. Because the switching door 24 closes the rear air outlet 19a of the foot duct 19, air flowing through the rear foot duct 19 is not supplied to the rear air outlet 19a. Cool air blown into the seat duct 21 is distributed into each seat air outlet 2b through the air distribution duct 2a, and is blown from the seat surface sheet 2C toward a passenger seated on the front seat 2 in the passenger compartment to give cool-feeling to the passenger compartment from the front seat 2.

When the temperature in the passenger compartment is lowered at a predetermined temperature and a stationary state is set from the cool-down state during the cooling mode, over-cooling feeling is given to the passenger seated on the front seat 2 when cool air is still blown from the seat surface sheet 2C of the front seat 2. In this case, as shown in FIG. 5, the switching door 23 closes the cool air passage 20, the switching door 24 fully opens the rear air outlet 19a of the rear foot duct 19, and the switching door 25 fully opens the seat duct 21. Thus, by operating the blower 18, inside air (i.e., air inside the passenger compartment) is sucked from the rear air outlet 19a of the rear foot duct 19, and is blown toward the seat duct 21, as shown by arrows in FIG. 5. In this case, because a switching door (not shown) closes the rear foot duct 19 at a side of the air conditioning unit, air from the air conditioning unit is not supplied to the rear foot duct 19. Inside air blown into the front seat 2 is distributed into each seat air outlet 2b through the air distribution duct 2a, and is blown from the seat surface sheet 2C toward the passenger seated on the front seat 2 in the passenger compartment to give suitable cool-feeling to the passenger from the front seat 2.

Figure 5:
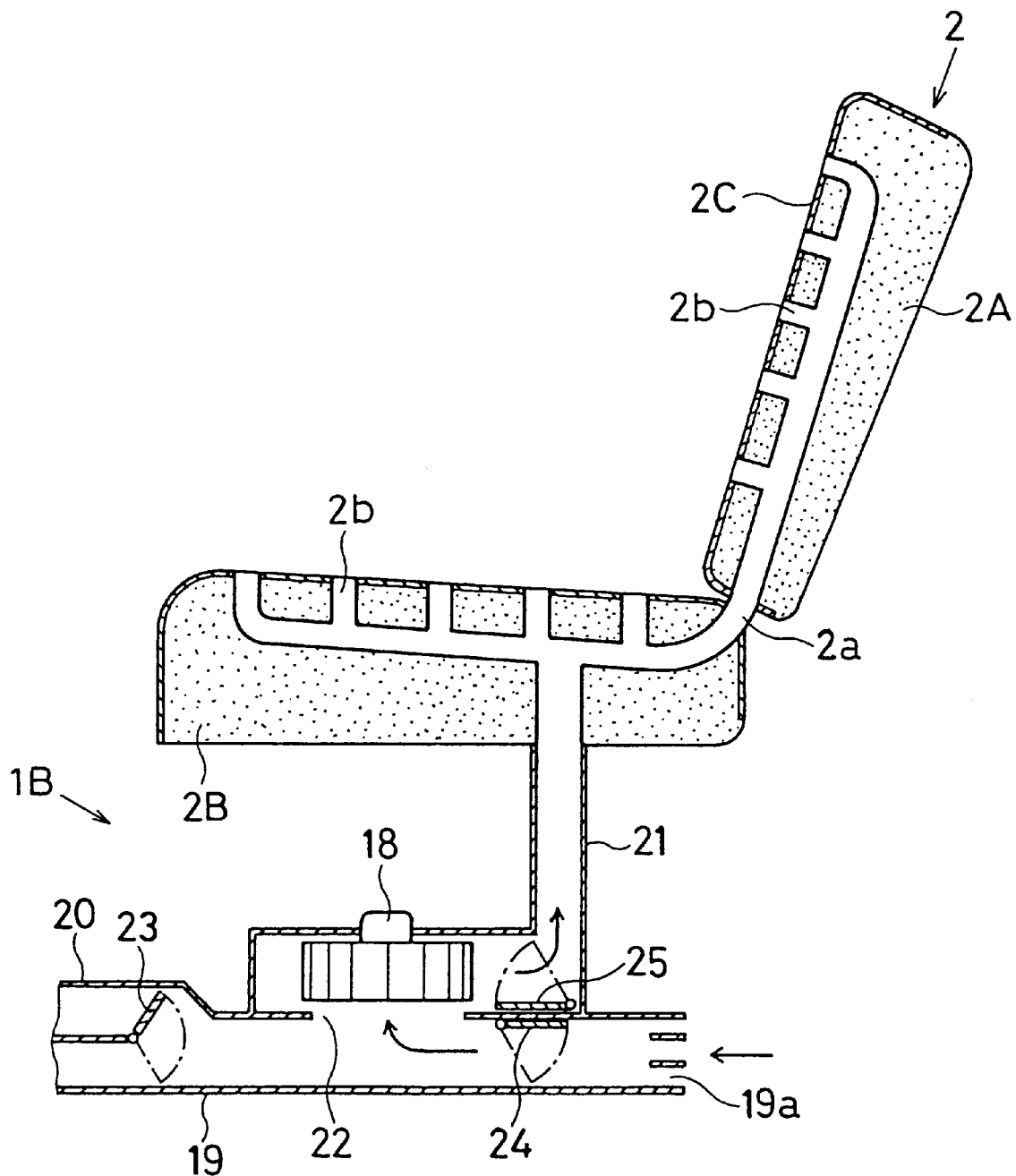
FIG. 5 is schematic sectional view showing a flow of warm air in the air conditioning apparatus according to the third embodiment.

When the cooling mode is switched (i.e., changed) from the cool-down state to the stationary state, the switching door 23 is gradually rotated from the position shown in FIG. 4 to the position shown in FIG. 5, and the switching door 24 is also gradually rotated from the position shown in FIG. 4 to the position shown in FIG. 5. Therefore, air supplied to the front seat 2 through the seat duct 21 is gradually changed from cool air conditioned in the air conditioning unit to inside air of the passenger compartment. Thus, in the third embodiment, a rapid variation in temperature of air blown from the front seat 2 can be prevented.

When air blown from the seat surface sheet 2C of the front seat 2 is not necessary, the switching door 25 is rotated to fully close the seat duct 21, and the operation of the blower 18 is stopped. Thus, in this case, even when the conditioned air is supplied from the air conditioning unit to the rear foot duct 19, the conditioned air does not flows through the seat duct 21.

According to the third embodiment, when the temperature of the passenger compartment is decreased during the cool-down state, and the stationary state is set from the cool-down state, air supplied to the front seat 2 is changed from cool air to inside air. Therefore, the over-cool feeling is not given to the passenger seated on the front seat 2. Further, because the rear air outlet 19a of the rear foot duct 19 can be used as the air suction port of inside air of the seat air-blowing unit when inside air is supplied to the front seat 2, a supplementary unit for obtaining inside air having the same temperature as the passenger compartment is not necessary, and cool air and inside air can be readily switched by using a simple structure.

Although the present invention has been fully described in connection with preferred embodiments thereof with reference to the accompanying drawings, it is to be noted that various changes and modifications will become apparent to those skilled in the art.

For example, in the above-described first embodiment, the rear foot air outlet 17 is provided in the case 11 of the seat air-blowing unit 3. However, the floor duct 4A may extend until the rear seat in the passenger compartment, and the end outlet of the floor duct 4A may be used as the rear foot air outlet. In the first embodiment, during the cooling mode, the switching door 8 may close the cool air passage 5 to fully open the warm air passage 6 from an initial time of the cool-down state. That is, from an initial time of the cool-down state, inside air may be supplied to the seat air-blowing unit 3. Further, when the rear vent duct is used as the seat air duct 4, cooling mode may be preferentially set in the rear seat. In this case, because the switching door 14 closes the air suction port 16, cool air is only supplied to the rear seat from a cool air outlet (not shown) of the seat air-blowing unit 3. Further, when the switching door 14 is rotated to an intermediate position to open both the air suction port 16 and the cool air outlet, cooling mode can be obtained in the rear seat while cool air is supplied to the front seat 2.

In the above-described third embodiment, cool air and warm air is switched by the switching door 23. However, cool air and warm air may be switched in the air conditioning unit, and air conditioned in the air conditioning unit may be blown into the seat duct 21 using a single duct, as described in the first embodiment. In the third embodiment, inside air is supplied to the front seat 2 in the stationary state during cooling mode. However, from an initial time of the cool-down state, inside air may be supplied to the seat air-blowing unit of the front seat 2.

In the above-described third embodiment, when inside air is supplied to the front seat 2, the rear air outlet 19a of the rear foot duct 19 is used as the air suction port of inside air. However, in a case where an air duct expect of the rear foot duct 19 is provided, inside air may be introduced from an air outlet of the air duct.

In the above-described embodiments, the control for switching cool air and inside air is described during the cooling mode. However, a control for switching warm air and inside air may be performed during the heating mode. For example, in the third embodiment, during a warm-up state, the switching door 23 closes the cool air duct 20, the switching door 24 closes the rear air outlet 19a, and the switching door 25 fully opens the seat duct 21. Therefore, warm air from the air conditioning unit is supplied to the rear foot duct 19, and is blown toward the front seat 2. When the temperature in the passenger compartment becomes higher and a stationary state is set from the warm-up state, the switching door 24 is gradually rotated to gradually open the foot air outlet 19a of the rear foot duct 19, and inside air is introduced from the rear air outlet 19a of the rear foot duct 19. At the same time, the supply of warm air from the air conditioning unit is gradually stopped. Thus, air blown from the seat surface sheet 2C of the front seat 2 can be gradually changed from warm air to inside air, to give pleasant feeling to the passenger seated on the front seat 2. Further, when air blown from the seat surface sheet 2C of the front seat 2 is not necessary, the switching door 25 is rotated to fully close the seat duct 21 and the blower 18 is stopped. Thus, even when warm air is supplied to the rear foot duct 19, the warm air is blown toward the foot area of a passenger seated on the rear seat in the passenger compartment from the rear air outlet 19a without flowing through the seat duct 21.

Such changes and modifications are to be understood as being within the scope of the present invention as defined by the appended claims.

What is claimed is:

1. An air conditioning apparatus for a seat disposed in a passenger compartment of a vehicle, said apparatus comprising:

an air conditioning unit for adjusting a temperature of air blown toward the passenger compartment;

a seat duct for forming an air passage for leading air from said air conditioning unit to the seat;

a blower, disposed in said seat duct, for blowing air toward the seat; and a mode switching unit for switching an air-blowing mode between a first mode where air from said air conditioning unit is introduced into the seat through said seat duct, and a second mode where air inside the passenger compartment is introduced into the seat through said seat duct.

2. The air conditioning apparatus according to claim 1, wherein:

said air conditioning unit has a first air outlet for blowing air toward a lower portion at a front side in the passenger compartment; and air inside the passenger compartment is introduced into the seat through said seat duct from said first air outlet, during said second mode.

3. The air conditioning apparatus according to claim 1, wherein:

said seat duct has a second air outlet for blowing air toward a lower portion at a rear side in the passenger compartment; and air inside the passenger compartment is introduced into the seat through said seat duct from said second air outlet, during said second mode.

4. The air conditioning apparatus according to claim 1, wherein said mode switching unit includes a switching door for opening and closing said air passage, and control means for controlling an operation of said switching door.

5. The air conditioning apparatus according to claim 1, wherein said seat duct is a duct for supplying warm air conditioned in said air conditioning unit to a lower portion at a rear side in the passenger compartment.

6. The air conditioning apparatus according to claim 1, wherein said seat duct is a duct for supplying cool air conditioned in said air conditioning unit to an upper portion at a rear side in the passenger compartment.

7. The air conditioning apparatus according to claim 1, wherein:

said mode switching door sets said first mode, when the temperature in the passenger compartment is necessary to change in an unstable state; and said mode switching door sets said second mode, when the temperature in the passenger compartment becomes to a set temperature in a stable state.

8. An air conditioning apparatus for a seat disposed in a passenger compartment of a vehicle, said apparatus comprising:

an air conditioning unit for adjusting a temperature of air blown toward the passenger compartment;

a seat duct for forming an air passage for leading air from said air conditioning unit to seat;

a blower, disposed in said heat duct, for blowing air toward the seat; and a mode switching unit for switching an air-blowing mode between a first mode where air from said air conditioning unit is introduced into the seat through said seat duct, and a second mode where air inside the passenger compartment is introduced into the seat through said seat duct;

wherein said blower is rotated in the same rotational direction when said mode switching unit switches said air-blowing mode between said first mode and said second mode.

9. The air conditioning apparatus according to claim 8, wherein:

said air conditioning unit has a first air outlet for blowing air toward a lower portion at a front side in the passenger compartment; and air inside the passenger compartment is introduced into the seat through said seat duct from said first air outlet, during said second mode.

10. The air conditioning apparatus according to claim 8, wherein:

said seat duct has a second air outlet for blowing air toward a lower portion at a rear side in the passenger compartment; and air inside the passenger compartment is introduced into the seat through said seat duct from said second air outlet, during said second mode.

11. The air conditioning apparatus according to claim 8, wherein said mode switching unit includes a switching door for opening and closing air passage, and control means for controlling an operation of said switching door.

12. The air conditioning apparatus according to claim 8, wherein said seat duct is a duct for supplying warm air conditioned in said air conditioning unit to a lower portion at a rear side in the passenger compartment.

13. The air conditioning apparatus according to claim 8, wherein said seat duct is a duct for supplying cool air conditioned in said air conditioning unit to an upper portion at a rear side in the passenger compartment.

14. An air conditioning apparatus for a seat disposed in a passenger compartment of a vehicle, the seat having therein a seat air passage, said apparatus comprising:

an air conditioning unit for adjusting a temperature of air blown toward the passenger compartment;

a seat duct for forming a duct air passage through which air from said air conditioning unit is supplied to said seat air passage of the seat;

a blower, disposed in said seat duct, for blowing air toward said seat air passage of the seat;

air introduction means for introducing air inside the passenger compartment to said seat air passage of the seat through said duct air passage; and air switching means for switching air supplied to said seat air passage of the seat between air from said air conditioning unit and air inside the passenger compartment, wherein said seat duct is a duct for leading air from said air conditioning unit to a rear side in the passenger compartment.

15. The air conditioning apparatus according to claim 14, wherein said blower is rotated in the same rotational direction when said mode switching unit switches said air-blowing mode between said first mode and said second mode.

16. An air conditioning apparatus for a seat disposed in a passenger compartment of a vehicle, said apparatus comprising:

an air conditioning unit for adjusting a temperature of air blown toward the passenger compartment;

a seat duct for forming an air passage for leading air from said air conditioning unit to seat;

a blower, disposed in said heat duct, for blowing air toward the seat; and a mode switching unit for switching an air-blowing mode between a first mode where air from said air conditioning unit is introduced into the seat through said seat duct, and a second mode where air inside the passenger compartment is introduced into the seat through said seat duct without passing through said air conditioning unit.

* * * * *